(12) United States Patent
Iwata et al.

(10) Patent No.: US 9,904,126 B2
(45) Date of Patent: Feb. 27, 2018

(54) LIQUID CRYSTAL DISPLAY DEVICE

(71) Applicant: Sharp Kabushiki Kaisha, Sakai, Osaka (JP)

(72) Inventors: Yosuke Iwata, Sakai (JP); Mitsuhiro Murata, Sakai (JP); Satoshi Matsumura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/318,988

(22) PCT Filed: Jul. 17, 2015

(86) PCT No.: PCT/JP2015/070480
§ 371 (c)(1),
(2) Date: Dec. 15, 2016

(87) PCT Pub. No.: WO2016/013500
PCT Pub. Date: Jan. 28, 2016

(65) Prior Publication Data
US 2017/0139290 A1    May 18, 2017

(30) Foreign Application Priority Data

Jul. 24, 2014  (JP) ................. 2014-151006

(51) Int. Cl.
*G02F 1/1343* (2006.01)
*G02F 1/1335* (2006.01)
*G02F 1/1368* (2006.01)

(52) U.S. Cl.
CPC ...... *G02F 1/134363* (2013.01); *G02F 1/1368* (2013.01); *G02F 1/13439* (2013.01);
(Continued)

(58) Field of Classification Search
CPC ............. G02F 2203/66; G02F 2203/64; G02F 2202/10; G02F 2001/134372;
(Continued)

(56) References Cited

U.S. PATENT DOCUMENTS 7,411,647 B2 * 8/2008 Ono ................. G02F 1/134363
349/141
9,383,614 B2 * 7/2016 Matsushima ..... G02F 1/133512
(Continued)

FOREIGN PATENT DOCUMENTS

JP    2002-182230 A    6/2002
JP    2014-115322 A    6/2014

OTHER PUBLICATIONS

Official Communication issued in International Patent Application No. PCT/JP2015/070480, dated Sep. 29, 2015.

*Primary Examiner* — Joseph L Williams
*Assistant Examiner* — Jose M Diaz
(74) *Attorney, Agent, or Firm* — Keating & Bennett, LLP (57) ABSTRACT

The present invention provides a liquid crystal display device capable of achieving a high response speed. The liquid crystal display device includes: an upper substrate and a lower substrate; and a liquid crystal layer disposed between the upper and lower substrates, the upper substrate including an electrode, the lower substrate including paired electrodes, the liquid crystal layer containing liquid crystal molecules that are aligned in parallel with the main surfaces of the upper and lower substrates with no voltage applied, the liquid crystal display device being configured to provide one of white display and black display by utilizing an electric field generated between the paired electrodes of the lower substrate to rotate the liquid crystal molecules in one direction in a plane parallel to the main surfaces, and the other of white display and black display by utilizing an electric field generated by the respective electrodes of the
(Continued)

upper and lower substrates to rotate the liquid crystal molecules in the opposite direction from the one direction in the plane parallel to the main surfaces.

20 Claims, 8 Drawing Sheets

(52) U.S. Cl.
CPC ............... *G02F 1/133528* (2013.01); *G02F 2001/134372* (2013.01); *G02F 2202/10* (2013.01); *G02F 2203/64* (2013.01); *G02F 2203/66* (2013.01)

(58) Field of Classification Search
CPC ............ G02F 1/134363; G02F 1/1368; G02F 1/133528; G02F 1/13439
See application file for complete search history.

(56) References Cited

U.S. PATENT DOCUMENTS

| | | | |
|---|---|---|---|
| 2002/0041354 A1 | 4/2002 | Noh et al. | |
| 2009/0002586 A1* | 1/2009 | Kimura | G02F 1/136213 349/39 |
| 2012/0300144 A1* | 11/2012 | Lee | G02F 1/139 349/33 |
| 2014/0132906 A1* | 5/2014 | Yoshioka | G02F 1/134309 349/141 |
| 2014/0160386 A1 | 6/2014 | Toko | |

* cited by examiner

LIQUID CRYSTAL DISPLAY DEVICE

TECHNICAL FIELD

The present invention relates to liquid crystal display devices. More specifically, the present invention relates to a liquid crystal display device that provides display by utilizing electric fields generated by electrodes.

BACKGROUND ART

Liquid crystal display devices having a configuration including a liquid crystal display element disposed between paired substrates such as glass substrates have characteristics such as a thin profile, lightweight, and low power consumption. These characteristics have made the devices essential to products used in daily life and business, such as automotive navigation systems, electronic books, digital photo frames, industrial equipment, televisions, personal computers, smartphones, and tablet computers. For liquid crystal display devices for use in these applications, various modes have been considered which relate to the electrode arrangement and substrate design for changes in the optical characteristics of the liquid crystal layer.

Recent liquid crystal display devices employ a display mode such as a vertical alignment (VA) mode which aligns liquid crystal molecules having negative anisotropy of dielectric constant in perpendicular to the substrate surface; an in-plane switching (IPS) mode which aligns liquid crystal molecules having positive or negative anisotropy of dielectric constant in parallel with the substrate surfaces and applies transverse electric fields to the liquid crystal layer; and a fringe field switching (FFS) mode.

For example, Patent Literature 1 discloses an FFS-mode liquid crystal display device comprising: a first and a second transparent insulating substrates arranged opposite to each other with a predetermined distance, with a liquid crystal layer including a plurality of liquid crystal molecules interposed between them; a plurality of gate bus lines and data bus lines formed on the first transparent substrate and arranged in a matrix form to define a unit pixel; a thin film transistor formed at the intersection of the gate bus line and the data bus line; a counter electrode disposed in each unit pixel, made of transparent conductor; and a pixel electrode arranged in each unit pixel to generate a fringe field with the counter electrode, being insulated with the counter electrode and made of transparent conductor and including a plurality of upper slits and lower slits symmetrical each other with respect to long side of the pixel with a predetermined tilted angle.

CITATION LIST

Patent Literature

Patent Literature 1: JP 2002-182230 A

SUMMARY OF INVENTION

Technical Problem

Patent Literature 1 discloses an FFS-mode liquid crystal display device that has a wide viewing angle and increases the aperture ratio and transmittance which are low in IPS-mode liquid crystal display devices (e.g., FIG. 6 in Patent Literature 1; FIG. 6 in Patent Literature 1 is a plan view illustrating a pixel structure of an FFS-mode liquid crystal display device). The FFS-mode liquid crystal display device of Patent Literature 1 can utilize electric fields to force a liquid crystal material to respond in rise time. However, the liquid crystal display device allows the liquid crystal material to respond just by its viscoelasticity without electric fields in decay time, leading to a slow response speed. The response performance can therefore still be improved.

Figure 7:
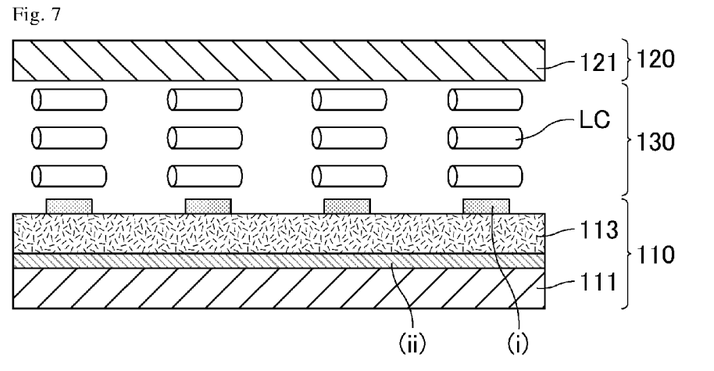
FIG. 7 is a schematic cross-sectional view illustrating the electrode structure of a liquid crystal display device of Comparative Example 1 and the alignment of liquid crystal molecules with no voltage applied.

One example of the FFS-mode liquid crystal display device of Patent Literature 1 is described with reference to FIG. 7. FIG. 7 is a schematic cross-sectional view illustrating a liquid crystal display device having a conventional FFS-mode electrode structure. FIG. 7 illustrates the structure of a liquid crystal display device in which in a lower substrate 110 including a slit electrode (i), the slit electrode (i) and a planar electrode (ii) are disposed with an insulating layer 113 in between. The liquid crystal display device obtains a rise response of a liquid crystal material by applying constant voltage to the slit electrode (i) (e.g., the voltage applied to the slit electrode (i) may be any value that can produce a potential difference equal to or higher than a threshold value with the planar electrode (ii) to generate fringe electric fields forcing the liquid crystal material to respond; the threshold value means a voltage value that generates an electric field by which the liquid crystal layer is optically changed and thus the display state of the liquid crystal display device is changed.), and obtains a decay response by controlling the potential difference between the slit electrode (i) and the planar electrode (ii) to a value lower than the threshold value so as to stop (weaken) the fringe electric field.

A conventional FFS mode performs switching in rise time by applying a fringe electric field generated by the FFS electrodes of the lower substrate as described above to liquid crystal molecules in the vicinity of the lower electrode, thereby greatly rotating the molecules. This mode, however, can apply only weak electric fields to the part of the liquid crystal layer in the vicinity of the upper substrate which is away from the electrodes, and thus unfortunately causes a decreased rotational speed of the liquid crystal material, leading to insufficient response performance. Also, this mode performs switching in decay time by stopping (weakening) the fringe electric field to allow the liquid crystal material to move back with its restoring force to the initial alignment. Here, since the liquid crystal molecules in the vicinity of the lower substrate have once been greatly rotated in rise time, it takes time for the molecules to go back to the initial alignment. Meanwhile, the liquid crystal molecules in the vicinity of the upper substrate are rotated by a small angle in rise time, but the twist, which becomes the restoring force to go back to the initial alignment, is small as well. Hence, it also takes time for the liquid crystal material in this region to go back to the initial alignment. These phenomena show that the response performance in decay time is insufficient in every region in the liquid crystal layer.

The present invention has been made in view of the current state of the art, and aims to provide a liquid crystal display device which can achieve a high response speed.

Solution to Problem

The inventors have made various studies on liquid crystal display devices that provide display by utilizing electric fields generated by electrodes. The inventors have then focused on an electrode structure in which the lower layer electrode of the lower substrate is a planar electrode and a slit electrode is disposed on the liquid crystal layer side of the lower layer electrode with an insulating layer in between (hereinafter, such an electrode structure is referred to as an FFS electrode structure). As a result, the inventors have found that a liquid crystal display device including a slit electrode also in the upper substrate and liquid crystal molecules with a horizontal initial alignment can control both switching in the rise time and switching in the decay time using electric fields. That is, the liquid crystal display device, for example, utilizes fringe electric fields generated between the electrodes of the lower substrate in rise time (to white display) to forcibly rotate a liquid crystal material in a horizontal plane, and utilizes oblique electric fields generated between the electrodes of the upper and lower substrates in decay time (to black display) to rotate the liquid crystal material in a horizontal plane in the opposite direction from that in the rise time. Here, the liquid crystal display device may utilize fringe electric fields generated between the electrodes of the lower substrate in decay time (to black display) to forcibly rotate the liquid crystal material in the vicinity of the lower substrate in a horizontal plane, and may utilize oblique electric fields generated between the electrodes of the upper and lower substrates in rise time (to white display) to rotate the liquid crystal material in the vicinity of the lower substrate in a horizontal plane in the opposite direction from that in the decay time. The inventors have further made intensive studies and arrived at a liquid crystal display device configured to utilize electric fields generated between the electrodes of the lower substrate to provide one of the white display and the black display, and utilize electric fields generated between the electrodes of the upper and lower substrates to provide the other of the white display and the black display. The inventors have found that such a liquid crystal display device can solve the above problem, thereby having completed the present invention.

The present invention provides the desired performance by its configuration of utilizing fringe electric fields generated between the electrodes of the lower substrate in rise time to forcibly rotate a liquid crystal material in a horizontal plane while utilizing oblique electric fields generated between the electrodes of the upper and lower substrates in decay time to rotate the liquid crystal material in a horizontal plane in the opposite direction from that in rise time. The present invention differs from the invention disclosed in Patent Literature 1 in this point.

One aspect of the present invention may be a liquid crystal display device including: an upper substrate and a lower substrate; and a liquid crystal layer disposed between the upper and lower substrates, the upper substrate including an electrode, the lower substrate including paired electrodes, the liquid crystal layer containing liquid crystal molecules that are aligned in parallel with the main surfaces of the upper and lower substrates with no voltage applied, the liquid crystal display device being configured to provide one of white display and black display by utilizing an electric field generated between the paired electrodes of the lower substrate to rotate the liquid crystal molecules in one direction in a plane parallel to the main surfaces, and the other of white display and black display by utilizing an electric field generated by the respective electrodes of the upper and lower substrates to rotate the liquid crystal molecules in the opposite direction from the one direction in the plane parallel to the main surfaces.

Preferably, in the liquid crystal display device of the present invention, when an electrode including a slit is disposed on each of the lower substrate and the upper substrate, the extension directions of these respective slit electrodes of the upper and lower substrates form an angle (the angle here is the smaller of the two angles; the same shall apply hereinafter.) of 30° or greater but smaller than 90°. The extension direction of each slit electrode is the longitudinal direction of a linear electrode part constituting the slit electrode. A conventional FFS-mode liquid crystal display device merely utilizes fringe electric fields generated by the FFS electrodes of the lower substrate in rise time, but the present invention utilizes fringe electric fields generated by the paired electrodes (preferably FFS electrodes) of the lower substrate in one of rise time and decay time and utilizes oblique electric fields generated by the respective electrodes disposed on the upper and lower substrates in the other of rise time and decay time.

A conventional FFS mode also merely rotates the liquid crystal molecules in one direction by utilizing the fringe electric fields generated by the FFS electrodes of the lower substrate. In contrast, the liquid crystal display device of the present invention preferably rotates the liquid crystal molecules in one direction in a horizontal plane in rise time and in the opposite direction from the one direction in a horizontal plane in decay time.

The liquid crystal display device of the present invention is not particularly limited by any other elements, and may appropriately have any other configurations usually used for liquid crystal display devices.

Advantageous Effects of Invention

The liquid crystal display device of the present invention can achieve a high response speed in both rise time and decay time.

DESCRIPTION OF EMBODIMENTS

The present invention will be described in more detail based on the following examples with reference to the drawings. The present invention, however, is not limited by these examples. A pixel herein may refer to a sub-pixel, unless otherwise specified. The paired substrates between which a liquid crystal layer is disposed may also be referred to as upper and lower substrates. Of these, a substrate on the display surface side may also be referred to as an upper substrate, and a substrate on the side opposite to the display surface may also be referred to as a lower substrate. Of the electrodes disposed in a substrate, an electrode on the display surface side may also be referred to as an upper layer electrode, and an electrode on the side opposite to the display surface may also be referred to as a lower layer electrode.

In the examples, the same reference signs are given to the components and parts providing the same function. Also in the drawings, unless otherwise stated, the reference sign (i) indicates a slit electrode disposed in the upper layer (on the liquid crystal layer side) of the lower substrate, the reference sign (ii) indicates a planar electrode in the lower layer (on the side opposite to the liquid crystal layer) of the lower substrate, and the reference sign (iii) indicates a slit electrode disposed in the upper substrate (also referred to as a counter electrode because this electrode faces the electrodes of the lower substrate). Also, dashed double-sided arrows in the drawings each indicate an electric field. The drawings do not illustrate layers such as color filters and a black matrix which are irrelevant to liquid crystal control using electric fields.

The "electrode of the lower substrate" herein is at least one of the slit electrode (i) and the planar electrode (ii). The "electrode of the upper substrate" is the slit electrode (iii). The "respective electrodes included in the upper and lower substrates" are the slit electrode (i), the planar electrode (ii), and the slit electrode (iii).

The slit electrode herein is an electrode including a slit, and usually includes plural linear electrode parts. Examples of the slit include a region in which no linear electrode part is formed. The planar electrode may have a structure in which electrodes in the respective pixels are independent from each other, or a structure in which electrodes in pixels are electrically connected, for example. The structure in which electrodes in pixels are electrically connected may be, for example, a structure in which electrodes in all the pixels are electrically connected, or a structure in which electrodes in pixels on the same line are electrically connected. In particular, the structure in which electrodes in all the pixels are electrically connected is preferred. Also, the term "planar" may refer to any shape considered to be a planar shape in the art of the present invention. The "planar" electrode may include alignment control structures such as ribs or slits in some regions thereof or may include the alignment control structures in the center portion of a pixel in a plan view of the main surfaces of the substrates. Still, substantially suitable is a planar electrode without alignment control structures.

The term "rise time" herein means the period during which the display state shifts from a dark state (black display) to a bright state (white display). The term "decay time" herein means the period during which the display state shifts from a bright state (white display) to a dark state (black display).

The slit electrode (i) on the liquid crystal layer side and the planar electrode (ii) on the side opposite to the liquid crystal layer can usually be set at different electric potentials producing voltage equal to or higher than the threshold voltage. The term "threshold voltage" herein means the voltage giving a transmittance of 5%, with the transmittance in the bright state being defined as 100%. The condition of "being set at different electric potentials producing voltage equal to or higher than the threshold voltage" may be any condition enabling driving at electric potentials that produce voltage equal to or higher than the threshold voltage. This condition enables suitable control of electric fields applied to the liquid crystal layer. A configuration that can provide different electric potentials may be, for example, in the case that the electrode on the liquid crystal layer side is a pixel electrode and the electrode on the side opposite to the liquid crystal layer is a common electrode, a configuration of driving the electrode on the liquid crystal layer side by a thin-film transistor (TFT) and driving the electrode on the side opposite to the liquid crystal layer by another TFT. The electrode on the side opposite to the liquid crystal layer here may consist of electrode parts commonly connected in the respective individual pixel lines or in all the pixels, and in such a case, the electrode may be driven by TFTs corresponding to the respective individual lines or a TFT corresponding to all of the pixels.

The liquid crystal molecules in the vicinity of the lower substrate herein may include, of the liquid crystal molecules in the liquid crystal layer, those at positions closer to the lower substrate than to the upper substrate.

EXAMPLE 1

Figure 1:
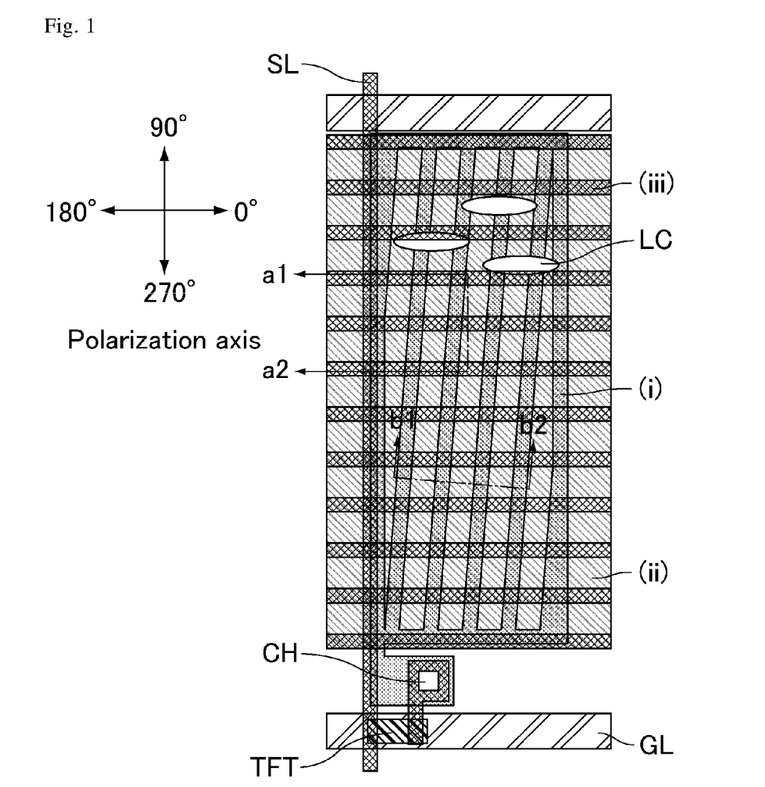
FIG. 1 is a schematic plan view illustrating the electrode structure illustrating a pixel in a liquid crystal display device of Example 1 and the alignment of liquid crystal molecules with no voltage applied.

FIG. 1 is a schematic plan view illustrating the electrode structure of a pixel in a liquid crystal display device of Example 1 and the alignment of liquid crystal molecules with no voltage applied.

The slit electrode (i) includes linear electrode parts in a plan view of the main surfaces of the substrates. The linear electrode parts are substantially parallel to each other, i.e., the slit electrode (i) includes slits which are substantially parallel to each other. Such an embodiment in which the electrode of the upper substrate is an electrode including a slit is one preferred embodiment of the present invention. The structure of the slit electrode (iii) is the same as that in the slit electrode (i). As described above, the electrode of the upper substrate and at least one of the paired electrodes of the lower substrate each preferably include linear parts.

The structures of the slit electrode (i) and the slit electrode (iii) illustrated in FIG. 1 are merely examples, and any other various structures including slits may be employed.

The extension direction of the slit electrode (i) and the extension direction of the slit electrode (iii) form an angle of 70°. The angle is preferably 30° or greater but smaller than 90°. Such an electrode structure can further shorten both the rise response time and the decay response time.

Example 1 employs two linear polarizers having the respective polarization axes illustrated in FIG. 1. In Example 1, one polarizer is disposed on the outer side (on the side opposite to the liquid crystal layer) of each of the upper and lower substrates. The polarizers used were linear polarizers disposed in crossed Nicols, with the polarization axes of the polarizers of the upper and lower substrates being perpendicular or parallel to the long axes of liquid crystal molecules. As described above, the upper and lower substrates each preferably include a linear polarizer.

The slit electrode (i), which is a pixel electrode, is electrically connected to the drain electrode extending from the corresponding thin-film transistor TFT through a contact hole CH. The liquid crystal display device applies, at a timing selected by a gate bus line GL, the voltage supplied from a source bus line SL to the pixel electrode designed to drive the liquid crystal material via the thin film transistor TFT.

Figure 2:
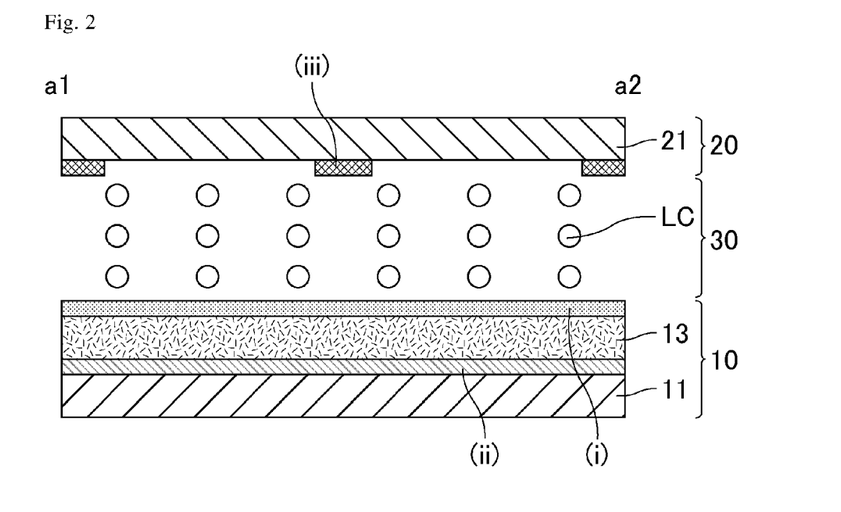
FIG. 2 is a schematic cross-sectional view illustrating a portion corresponding to the line a1-a2 illustrated in FIG. 1.
Figure 3:
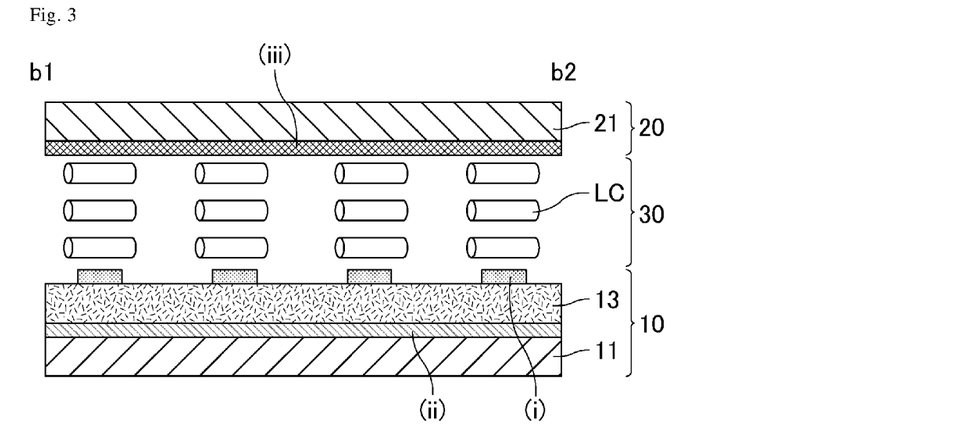
FIG. 3 is a schematic cross-sectional view illustrating a portion corresponding to the line b1-b2 illustrated in FIG. 1.

FIG. 2 is a schematic cross-sectional view illustrating a portion corresponding to the line a1-a2 illustrated in FIG. 1. FIG. 3 is a schematic cross-sectional view illustrating a portion corresponding to the line b1-b2 illustrated in FIG. 1.

The liquid crystal display device of Example 1 has a configuration including, as illustrated in FIG. 2 and FIG. 3, a lower substrate 10, a liquid crystal layer 30, and an upper substrate 20 in the given order from the back side to the viewer side of the liquid crystal display device.

The liquid crystal display device of Example 1, as illustrated in FIG. 2 and FIG. 3, horizontally aligns the liquid crystal molecules LC when the potential difference between the electrodes of the upper and lower substrates is lower than the threshold voltage.

The lower layer electrode of the lower substrate 10 is the planar electrode (ii), and the slit electrode (i) is disposed thereon with an insulating layer 13 in between. Such an embodiment in which the electrodes of the lower substrate (the paired electrodes of the lower substrate) are formed by an electrode including a slit and disposed on the liquid crystal layer side and a planar electrode disposed on the side opposite to the liquid crystal layer is one preferred embodiment of the present invention. The upper substrate 20 also includes the slit electrode (iii). In Example 1, as described above, the respective slit electrodes of the upper and lower substrates are disposed with the extension directions thereof crossing at an angle of 70° in a plan view of the main surfaces of the substrates.

In the slit electrode (i), an electrode width L of each linear part is 3.0 μm, and an electrode space S between adjacent linear parts is 3.0 μm. The electrode width L is preferably in the range of 2 μm to 7 μm, for example. The electrode space S is preferably in the range of 2 μm to 7 μm, for example. The ratio (L/S) of the electrode width L and the electrode space S is preferably 0.2 to 3. The lower limit of the ratio L/S is more preferably 0.25, while the upper limit thereof is more preferably 1.5.

In the slit electrode (iii), the electrode width L of each linear part is 3.0 μm, and an electrode space S between adjacent linear parts is 9.0 μm. The electrode width L is preferably in the range of 2 μm to 7 μm. The electrode space S is preferably in the range of 3 μm to 18 μm. The ratio (L/S) of the electrode width L and the electrode space S is preferably 0.1 to 2.5. The lower limit of the ratio L/S is more preferably 0.14, still more preferably 0.18, particularly preferably 0.22. Also, the upper limit of the ratio L/S is more preferably 2, still more preferably 1, particularly preferably 0.6.

The electrode widths L of the slit electrode (i) are usually substantially the same in a pixel, and the electrode spaces S thereof are usually substantially the same in a pixel. If the electrode widths L are different in a pixel, one of the widths is preferably in the above range, and all the widths are more preferably in the above range. Also, if the electrode spaces S are different in a pixel, one of the spaces is preferably in the above range, and all the spaces are more preferably in the above range. The same shall apply to the slit electrode (iii).

As illustrated in FIG. 2 and FIG. 3, the slit electrode (i) and the slit electrode (iii) each are usually disposed in the same layer. The expression that the slit electrode is disposed in the same layer means that the slit electrode is in contact with the same component (e.g. insulating layer, liquid crystal layer), on the liquid crystal layer side and/or on the side opposite to the liquid crystal layer.

The insulating layer 13 has a dielectric constant of 6.9 and an average thickness of 0.3 μm. The insulating layer 13 is a nitride film SiN, but may be an oxide film $SiO_2$, an acrylic rein, or a combination of these materials.

The upper and lower substrates each included a horizontal alignment film (not illustrated) on the liquid crystal layer side which was designed to horizontally align liquid crystal molecules with no voltage applied such that the azimuth angle direction of each molecule was in parallel with the extension direction of the slit electrode (iii). The horizontal alignment film may be any film that aligns the liquid crystal molecules in parallel with the film surface. Examples thereof include an alignment film made of an organic material or inorganic material, a photoalignment film made of a photoactive material, and an alignment film on which alignment treatment has been performed by a technique such as rubbing. The alignment film may be an alignment film on which the alignment treatment by a technique such as rubbing has not been performed. An alignment film for which alignment treatment is not necessary, such as an alignment film made of an organic or inorganic material or a photoalignment film, can achieve simplification of the process, leading to reduction of the cost as well as increase in reliability and in yield. The rubbing treatment may unfortunately cause liquid crystal contamination with impurities from the rubbing cloth or due to some other reason, point defects due to foreign substances, and display unevenness due to non-uniform rubbing in the liquid crystal panel. Alignment films for which alignment treatment is not necessary can also avoid such disadvantages.

The liquid crystal material includes liquid crystal molecules that are aligned in parallel with the main surfaces of the substrates with no voltage applied. The state of being "aligned in parallel with the main surfaces of the substrates" may be any state in which the liquid crystal molecules are regarded as being substantially aligned in parallel with the main surfaces of the substrates in the art of the present invention and optical effects can be achieved. It is suitable that the liquid crystal material substantially consists of liquid crystal molecules that are aligned in parallel with the main surfaces of the substrates with no voltage applied. The state of being "with no voltage applied" may be any state in which voltage is substantially regarded as being not applied in the art of the present invention. Such a horizontal alignment liquid crystal material is advantageous in achieving a wide viewing angle.

In the liquid crystal display device of Example 1, the liquid crystal layer 30 is made of a liquid crystal material having negative anisotropy of dielectric constant (anisotropy of dielectric constant $\Delta\epsilon=-3.1$, refractive index $\Delta n=0.1$). Such an embodiment in which the liquid crystal layer contains liquid crystal molecules having negative anisotropy of dielectric constant is one preferred embodiment of the present invention. Liquid crystal molecules having negative anisotropy of dielectric constant can further improve the viewing angle characteristics because a small proportion of the molecules are rotated vertically by the electric fields generated between the upper and lower substrates, and a large proportion of the molecules are rotated in a horizontal plane. The liquid crystal material may have positive anisotropy of dielectric constant, but preferably has negative anisotropy of dielectric constant. The liquid crystal material also preferably has anisotropy of dielectric constant $\Delta\epsilon$ of 3 or less, more preferably 1 or less, still more preferably −2 or less. The anisotropy of dielectric constant $\Delta\epsilon$ of the liquid crystal material herein refers to a value measured by an LCR meter.

In Example 1, the liquid crystal layer 30 has an average thickness (cell gap) $d_{LC}$ of 3.2 μm.

The average thickness $d_{LC}$ of the liquid crystal layer herein means a thickness calculated by averaging the thicknesses of the entire liquid crystal layer in the liquid crystal display device.

The value of $d_{LC} \times \Delta n$ is preferably 100 nm or greater, more preferably 150 nm or greater, still more preferably 200 nm or greater. Also, the value of $d_{LC} \times \Delta n$ is preferably 550 nm or smaller, more preferably 500 nm or smaller, still more preferably 450 nm or smaller.

Figure 4:
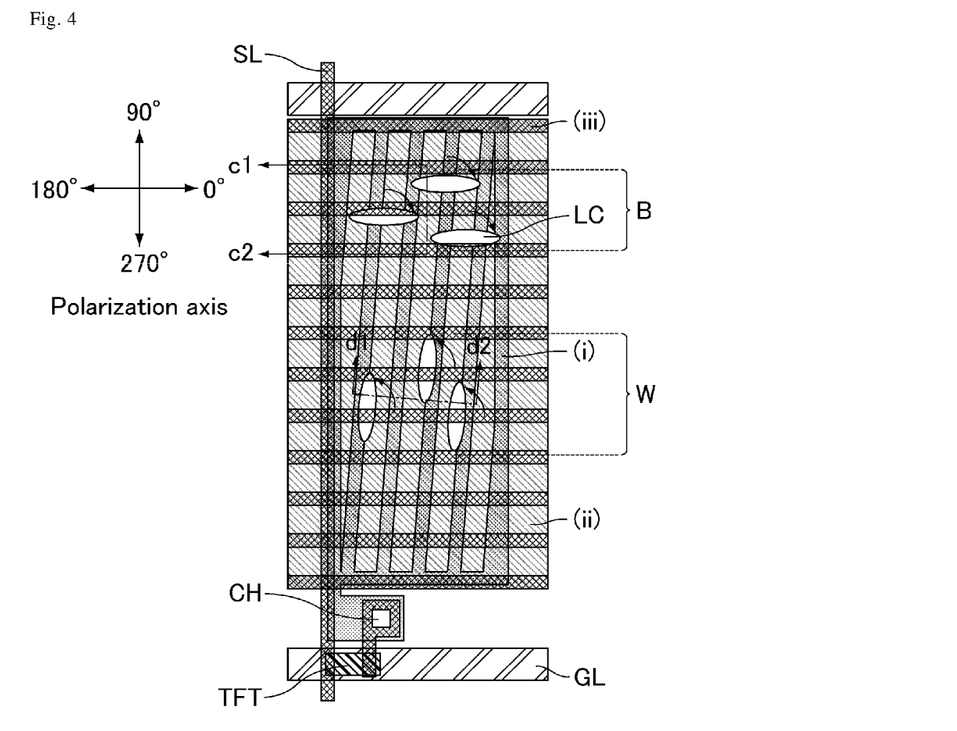
FIG. 4 is a schematic plan view illustrating the electrode structure of a pixel in the liquid crystal display device of Example 1 and the alignment of liquid crystal molecules in black display and the alignment of liquid crystal molecules in white display.

FIG. 4 is a schematic plan view illustrating the electrode structure of a pixel in the liquid crystal display device of Example 1 and the alignment of liquid crystal molecules in black display and the alignment of liquid crystal molecules in white display.

This structure utilizes fringe electric fields generated between the electrodes of the lower substrate in rise time to forcibly rotate the liquid crystal material in a horizontal plane, and utilizes oblique electric fields generated between the electrode of the upper substrate and the electrodes of the lower substrate in decay time to rotate the liquid crystal material in a horizontal plane in the opposite direction from that in the rise time.

Thereby, the structure can control the switching in both rise time and decay time with electric fields, and thus can achieve both a wide viewing angle and a high response speed.

Figure 5:
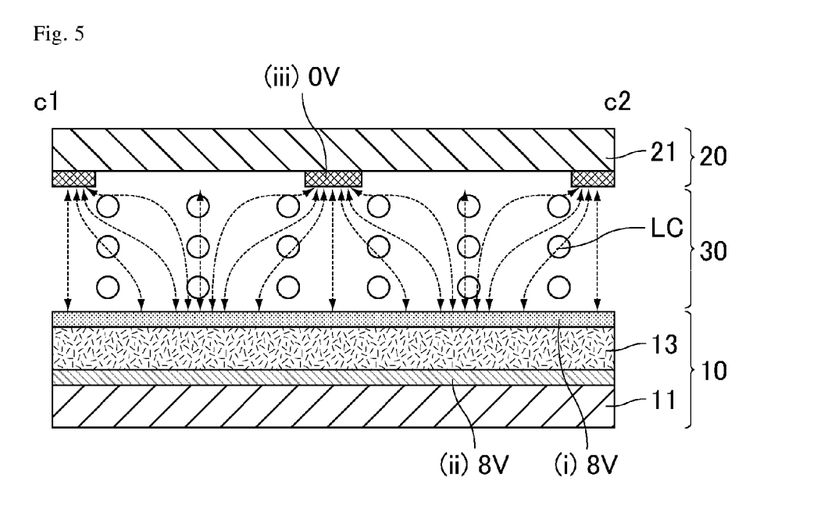
FIG. 5 is a schematic cross-sectional view illustrating a portion corresponding to the line c1-c2 illustrated in FIG. 4 and the alignment of liquid crystal molecules in black display.

FIG. 5 is a schematic cross-sectional view illustrating a portion corresponding to the line c1-c2 illustrated in FIG. 4 and the alignment of liquid crystal molecules in black display.

The liquid crystal display device of Example 1 in decay time (to black display) utilizes oblique electric fields generated between the slit electrode disposed in the upper substrate and the FFS electrodes disposed in the lower substrate (see a region B of FIG. 4 in which black display is provided by oblique electric fields between the upper and lower substrates, and FIG. 5). In FIG. 4 and FIG. 5, black display is provided by applying voltages to the slit electrode (i) and the planar electrode (ii) to generate electric fields between the slit electrode (iii) and the paired slit electrode (i) and planar electrode (ii), and thereby rotating with the electric fields the liquid crystal molecules in parallel with the substrates in the opposite direction from that in the later-described rise time. FIG. 5 illustrates an example of voltage application in black display and the lines of electric force (dashed double-sided arrows) generated during the voltage application in the liquid crystal cell.

The potential difference between the respective electrodes of the upper and lower substrates is set such that fringe electric fields rotating the liquid crystal material are not generated between the slit electrode (i) and the planar electrode (ii). In such a state, oblique electric fields are generated between the slit electrode (iii) and the paired slit electrode (i) and planar electrode (ii). In particular, the electric potential of the slit electrode (i) is set to 8 V and the electric potential of the planar electrode (ii) is set to 8 V so that the potential difference between the slit electrode (i) and the planar electrode (ii) is set to 0 V. The potential difference between the slit electrode (i) and the planar electrode (ii) may be lower than the threshold voltage. Furthermore, the electric potential of the slit electrode (iii) is set to 0 V, the potential difference between the slit electrode (i) and the slit electrode (iii) is set to 8 V, and the potential difference between the planar electrode (ii) and the slit electrode (iii) is set to 8 V. The potential difference between the slit electrode (i) and the slit electrode (iii) may be any value equal to or higher than the threshold voltage, but is preferably 2 V or higher, more preferably 4 V or higher, still more preferably 6 V or higher, for example.

The preferred potential difference between the planar electrode (ii) and the slit electrode (iii) is the same as the preferred electrode difference between the slit electrode (i) and the slit electrode (iii) described above.

As illustrated in FIG. 5, the device utilizes oblique electric fields generated between the slit electrode (iii) and the paired slit electrode (i) and planar electrode (ii) to rotate the liquid crystal molecules in a horizontal plane. As a result, the device can achieve a high response speed for the switching in decay time.

Figure 6:
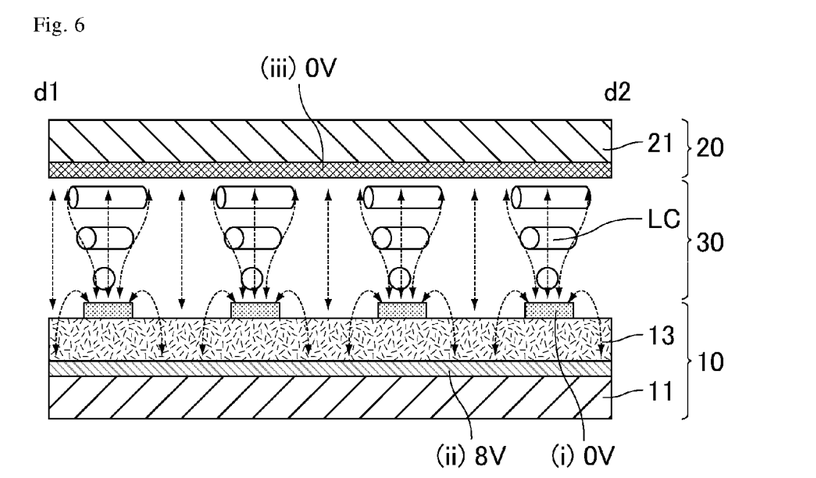
FIG. 6 is a schematic cross-sectional view illustrating a portion corresponding to the line d1-d2 illustrated in FIG. 4 and the alignment of liquid crystal molecules in white display.

FIG. 6 is a schematic cross-sectional view illustrating a portion corresponding to the line d1-d2 illustrated in FIG. 4 and the alignment of liquid crystal molecules in white display.

The liquid crystal display device of Example 1 in rise time (to white display) utilizes fringe electric fields generated between the FFS electrodes disposed in the lower substrate (see a region W in FIG. 4 in which white display is provided with fringe electric fields of the lower substrate, and FIG. 6). In FIG. 4 and FIG. 6, white display is provided by applying voltage to the slit electrode (i) to generate fringe electric fields between the slit electrode (i) and the planar electrode (ii), and thereby rotating with the electric fields the liquid crystal molecules in parallel with the substrates. FIG. 6 illustrates an example of voltage application in white display and the lines of electric force (dashed double-sided arrows) generated during the voltage application in the liquid crystal cell.

To the slit electrode (iii) is applied direct current voltage (DC voltage) that does not rotate the liquid crystal material in the direction perpendicular to the substrates between the planar electrode (ii) and the slit electrode (iii). In particular, the electric potential of the slit electrode (i) is set to 0 V and the electric potential of the planar electrode (ii) is set to 8 V so that the potential difference between the slit electrode (i) and the planar electrode (ii) is 8 V. The potential difference between the slit electrode (i) and the planar electrode (ii) may be any value equal to or higher than the threshold voltage, and can be appropriately set according to the desired amount of light transmittance (gray scale). For example, the potential difference is preferably 2 V or higher, more preferably 3 V or higher, still more preferably 4 V or higher. Also, the electric potential of the slit electrode (iii) is set to 0 V so that the potential difference between the planar electrode (ii) and the slit electrode (iii) is 0 V. The potential difference between the planar electrode (ii) and the slit electrode (iii) may be any value lower than the threshold voltage.

As illustrated in FIG. 6, the fringe electric fields generated between the slit electrode (i) and the planar electrode (ii) can rotate the liquid crystal molecules in the vicinity of the lower substrate in a horizontal plane. As a result, the liquid crystal display device can achieve a high response speed for switching in rise time.

The method of applying voltage to the electrodes to generate fringe electric fields may employ a combination of a common electrode serving as the slit electrode (i) and pixel electrodes serving as the planar electrode (ii), or a combination of pixel electrodes serving as the slit electrode (i) and a common electrode serving as the planar electrode (ii) (FIGS. 4 to 6 illustrate a pattern of this combination).

As described above, the liquid crystal display device with the electrode arrangement in Example 1 utilizes fringe electric fields generated between the FFS electrodes of the lower substrate or oblique electric fields generated between the electrodes of the upper and lower substrates so as to rotate the liquid crystal molecules in the vicinity of the lower substrate in the forward direction or reverse direction in a horizontal plane.

The liquid crystal display device may utilize fringe electric fields generated between the electrodes of the lower substrate in decay time (to black display) to rotate liquid crystal molecules in a horizontal plane, while utilizing oblique electric fields generated between the electrodes of the upper and lower substrates in rise time (to white display) to rotate liquid crystal molecules in the opposite direction from that in decay time in a horizontal plane. Such a liquid crystal display device can achieve the effects of the present invention.

Accordingly, the liquid crystal display device can achieve a high response speed in both rise time and decay time, thereby simultaneously achieving a wide viewing angle and a high response speed. In Example 1, the slit electrode (iii) of the upper substrate is set at an electric potential of 0 V in both white display and black display. As in this case, the liquid crystal display device of the present invention preferably applies a certain level of voltage to the electrode of the upper substrate in both white display and black display. The slit electrode (iii) may therefore be any slit electrode driven by direct current (DC drive), and does not need to be driven by alternating current (AC drive). This configuration eliminates the need for driving the electrode of the upper substrate with a TFT, simplifying driving.

In Example 1, the lower substrate included FFS electrodes. Such an embodiment in which the electrodes of the lower substrate are formed by an electrode including a slit and disposed on the liquid crystal layer side and a planar electrode disposed on the side opposite to the liquid crystal layer is one preferred embodiment of the liquid crystal display device of the present invention. Here, since any liquid crystal display device generating the electric fields as defined in the present invention can achieve the effects of the present invention, the FFS electrodes of the lower substrate may be replaced by paired comb electrodes. In the case of employing paired comb electrodes, the liquid crystal display device utilizes transverse electric fields generated between the comb electrodes to rotate the liquid crystal molecules in a horizontal plane. The relation between the alignment direction of the liquid crystal molecules and the electrode arrangement can be determined by replacing the extension direction of the slit electrode included in the FFS electrodes by the extension direction of the paired comb electrodes.

The thin film transistors in the liquid crystal display device of Example 1 are preferably oxide semiconductor TFTs in order to achieve higher transmittance. An oxide semiconductor has higher carrier mobility than amorphous silicon. Accordingly, the area occupied by such a transistor in one pixel can be reduced, so that the aperture ratio can be increased. Thereby, a higher light transmittance per pixel can be achieved. Hence, use of oxide semiconductor TFTs can provide a more significant effect of achieving a higher transmittance, which is an effect of the present invention. This means that at least one of the upper and lower substrates preferably includes thin film transistors which preferably contain an oxide semiconductor.

The upper and lower substrates in the liquid crystal display device of Example 1 are usually paired substrates that are designed to hold a liquid crystal material in between. The substrates are produced by, for example, forming components such as conductive lines, electrodes, and color filters on insulating substrates (bases) made of a material such as glass or resin.

The liquid crystal display device of Example 1 can appropriately include components (e.g. light sources) which are included in a common liquid crystal display device. Also, the liquid crystal display device of Example 1 is preferably configured to drive the liquid crystal material by the active matrix driving. The same shall apply to the examples described later.

The liquid crystal display device of Example 1 can be applied to any of transmissive, reflective, and transflective liquid crystal display devices. The same shall apply to the examples described later.

COMPARATIVE EXAMPLE 1

FIG. 7 is a schematic cross-sectional view illustrating the electrode structure of a liquid crystal display device of Comparative Example 1 and the alignment of liquid crystal molecules with no voltage applied.

FIG. 7 is also a schematic cross-sectional view illustrating one example of the electrode structure of a liquid crystal display device in a conventional FFS mode.

The lower layer electrode of a lower substrate 110 is the planar electrode (ii), and the slit electrode (i) is disposed on the lower layer electrode with the insulating layer 113 in between. An upper substrate 120 does not include electrodes for liquid crystal control.

The upper and lower substrates each included a horizontal alignment film (not illustrated) on the liquid crystal layer side, and horizontally aligned the liquid crystal molecules such that the azimuth angle of the molecules with no voltage applied was 83° from the extension direction of the slit electrode (i). Also, the upper and lower substrates each included a polarizer (not illustrated) on the side opposite to the liquid crystal layer. The polarizers used were linear polarizers, and arranged in crossed Nicols, with the polarization axes of the polarizers of the upper and lower substrates being perpendicular or parallel to the long axes of liquid crystal molecules. Also, the liquid crystal material had negative anisotropy of dielectric constant (anisotropy of dielectric constant $\Delta\varepsilon=-3.6$, refractive index $\Delta n=0.1$). In the slit electrode (i), an electrode width L of each linear part was 3.0 μm and an electrode space S between adjacent linear parts was 3.0 μm. The other configurations of the liquid crystal display device of Comparative Example 1, such as the average thickness of the liquid crystal layer 130 and the dielectric constant and average thickness of the insulating layer 113, are the same as those of the corresponding components in the liquid crystal display device of Example 1. The reference signs shown in FIG. 7 for Comparative Example 1 which are the same as those shown in the drawings for Example 1 except for the numeral "1" in the hundreds digit indicate the components corresponding to those illustrated in the drawings for Example 1.

(Comparison of Response Performance)

The effect on increase in response speed was analyzed by calculating the response waveforms in the examples and comparative examples with an LCDMaster 3D available from Shintech, Inc. The simulation conditions (e.g., electrode configuration, applied voltage, liquid crystal properties) in the examples and comparative examples are as described herein. The same shall apply to the later-described examples and comparative examples.

The display mode of the liquid crystal display device in each example is normally black in which black display corresponds to a gray scale value of 0 and white display corresponds to a gray scale value of 255, with a greater gray scale value indicating a higher voltage applied to the liquid crystal layer. The luminance is normalized by taking the normalized transmittance at a gray scale value of 255 as 100%.

RESPONSE PERFORMANCE COMPARISON BETWEEN EXAMPLES 1 TO 5 AND COMPARATIVE EXAMPLE 1

Figure 8:
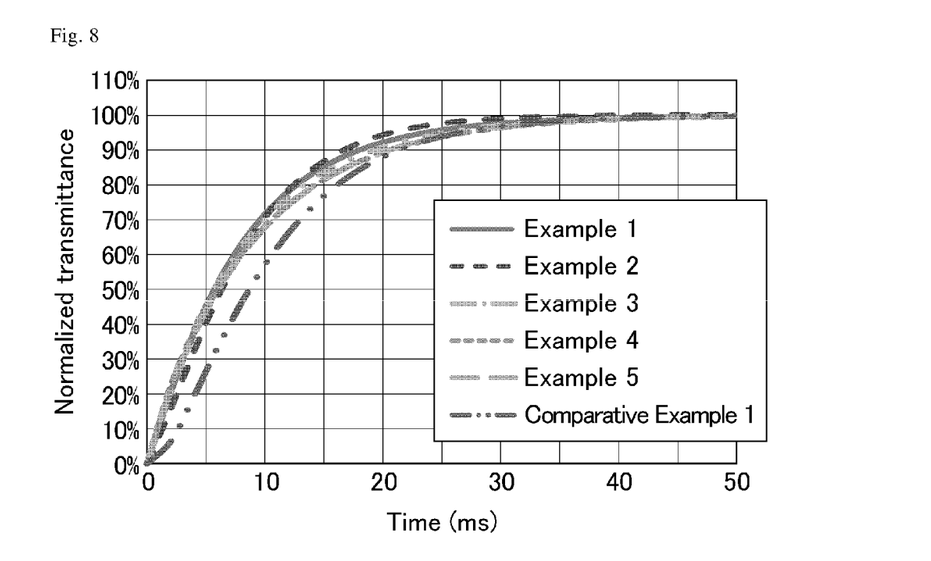
FIG. 8 shows simulation results with the normalized transmittance (%) plotted against rise time (ms) in Examples 1 to 5 and Comparative Example 1.
Figure 9:
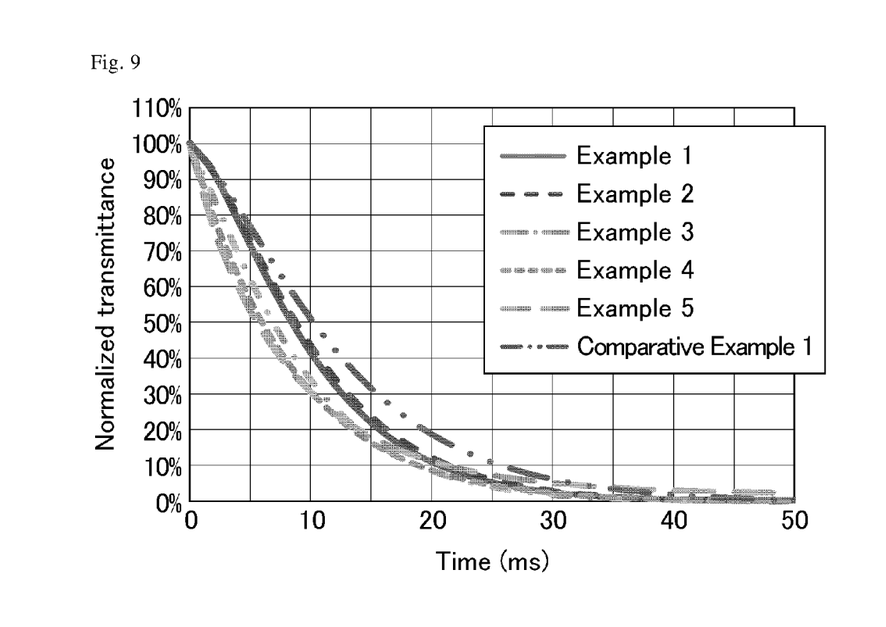
FIG. 9 shows simulation results with the normalized transmittance (%) plotted against decay time (ms) in Examples 1 to 5 and Comparative Example 1.

FIG. 8 shows simulation results with the normalized transmittance (%) plotted against rise time (ms) in Examples 1 to 5 and Comparative Example 1. FIG. 9 shows simulation results with the normalized transmittance (%) plotted against decay time (ms) in Examples 1 to 5 and Comparative Example 1.

First, response performance comparison was made between Example 1 and Comparative 1. FIGS. 8 and 9 respectively illustrate response in rise time and response in decay time in the configuration of the liquid crystal display device of Example 1 when the voltages for black display and white display as illustrated in FIGS. 5 and 6 were applied to the electrodes. FIGS. 8 and 9 also respectively illustrate rise response and decay response in the FFS-mode liquid crystal display device of Comparative Example 1 when a voltage of 6 V for white display was applied to the slit electrode (i) and a voltage of 0 V was applied to the planar electrode (ii) as illustrated in FIG. 7.

The rise response time τr is defined as the time during which the transmittance changes from 10% to 90%, and the decay response time τd is defined as the time during which the transmittance changes from 90% to 10%. Based on these definitions, the time τr+τd in Example 1 was 35.4 ms, and the time τr+τd in Comparative Example 1 was 41.9 ms. The time tr+td in Example 1 was shorter than that in Comparative Example 1, which shows that Example 1 achieved a higher response speed.

Figure 10:
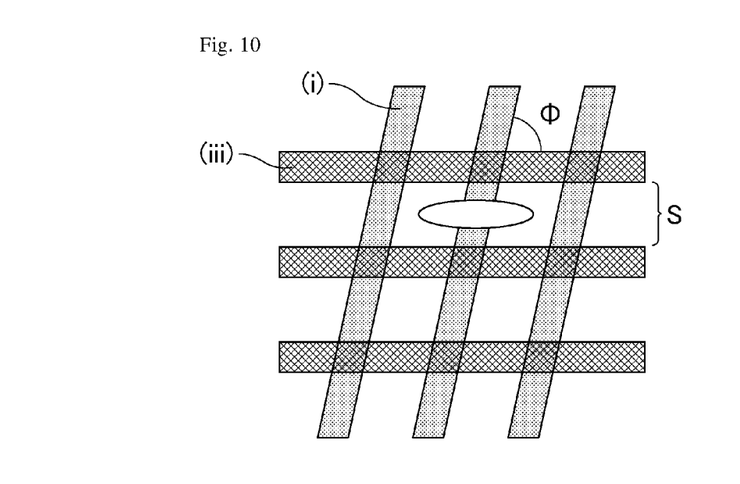
FIG. 10 is an illustrative drawing of Φ and S.

FIG. 10 is an illustrative drawing of Φ and S.

The angle formed by the extension direction of the slit electrode (i) of the lower substrate and the extension direction of the slit electrode (iii) of the upper substrate in a plan view of the main surfaces of the substrates (the angle that is 90° or smaller) is referred to as Φ. The electrode space between adjacent linear parts in the slit electrode (iii) of the upper substrate is referred to as S.

Although the above angle Φ was 70° and the electrode space S was 9 μm in Example 1, any electrode structure which can produce a potential difference between the electrodes of the upper substrate and the lower substrate to generate oblique electric fields between the upper and lower substrates may be employed in place of the electrode structure in Example 1. Examples with different angles Φ and different electrode spaces S are described below.

Next, response performance comparison is made between Examples 2 to 5 and Comparative Example 1. Examples 2 to 5 are the same as Example 1 except that the angle Φ was changed from 70° (Example 1) to 83° (Example 2), 60° (Example 3), 45° (Example 4), or 30° (Example 5). FIGS. 8 and 9 show the response waveforms in Examples 2 to 5 and Table 1 shows the time τr+τd in these examples.

TABLE 1

|  | Φ (°) | τr + τd |
|---|---|---|
| Example 1 | 70 | 35.4 |
| Example 2 | 83 | 34.6 |
| Example 3 | 60 | 36.4 |
| Example 4 | 45 | 37.3 |
| Example 5 | 30 | 39.8 |
| Comparative Example 1 | (FFS) | 41.9 |

FIG. 8, FIG. 9, and Table 1 show that the times τr+τd at Φ≥30° are smaller than that in Comparative Example 1. As in these results, in a plan view of the main surfaces of the upper and lower substrates, the extension direction of the electrode including a slit of the upper substrate and the extension direction of the electrode including a slit of the lower substrate preferably form an angle Φ of 30° or greater but smaller than 90°. These extension directions more preferably form an angle Φ of 40° or greater, more preferably 50° or greater, still more preferably 60° or greater, particularly preferably 65° or greater.

RESPONSE PERFORMANCE COMPARISON BETWEEN EXAMPLES 6 TO 8 AND COMPARATIVE EXAMPLE 1

Figure 11:
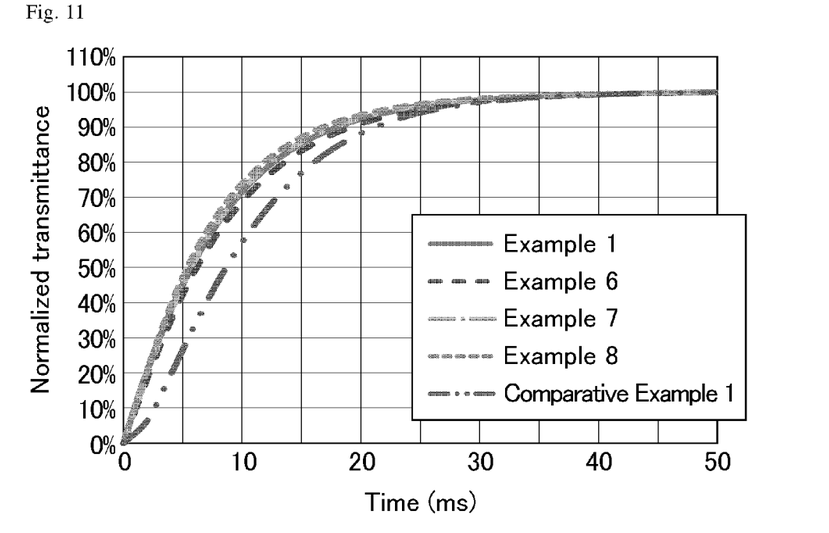
FIG. 11 shows simulation results with the normalized transmittance (%) plotted against rise time (ms) in Examples 1 and 6 to 8 and Comparative Example 1.
Figure 12:
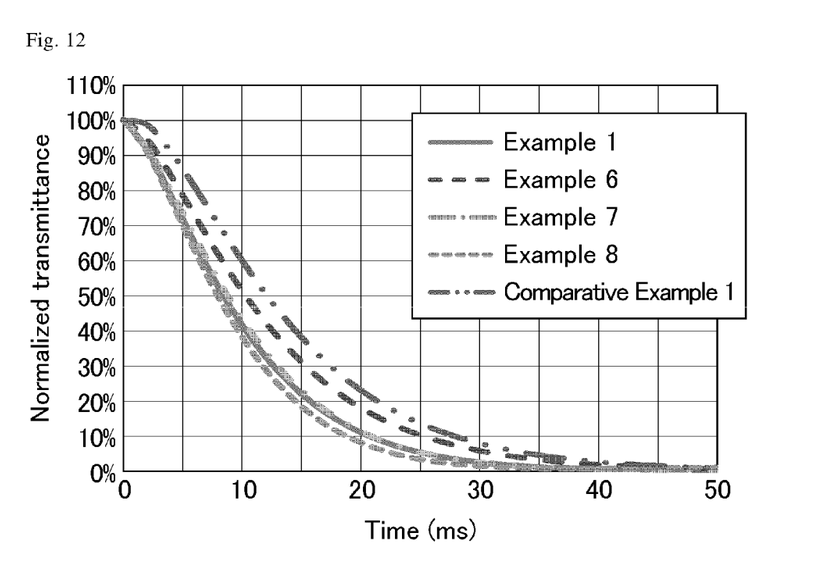
FIG. 12 shows simulation results with the normalized transmittance (%) plotted against decay time (ms) in Examples 1 and 6 to 8 and Comparative Example 1.

FIG. 11 shows simulation results with the normalized transmittance (%) plotted against rise time (ms) in Examples 1 and 6 to 8 and Comparative Example 1. FIG. 12 shows simulation results with the normalized transmittance (%) plotted against decay time (ms) in Examples 1 and 6 to 8 and Comparative Example 1.

Examples 6 to 8 were the same as Example 1 (with the same angle Φ fixed at 70°) except that the electrode space S was changed from 9 μm to 3 μm (Example 6), 6 μm (Example 7), or 12 μm (Example 8). FIGS. 11 and 12 show the response waveforms in Examples 6 to 8 and Table 2 shows the time τr+τd in these examples. Since the electrode space S is preferably 3 μm or greater for manufacturing reasons such as the yield, the minimum value of S was set to 3 μm.

TABLE 2

|  | S (μm) | τr + τd |
|---|---|---|
| Example 1 | 9 | 35.4 |
| Example 6 | 3 | 40.4 |
| Example 7 | 6 | 35.5 |
| Example 8 | 12 | 32.6 |
| Comparative Example 1 | (FFS) | 41.9 |

FIG. 11, FIG. 12, and Table 2 show that as the value S increases, the time τr+τd shortens, meaning that the response speed increases. Thus, the electrode space S of the electrode including a slit of the upper substrate is preferably 3 μm or greater, more preferably 6 μm or greater, still more preferably 8 μm or greater, particularly preferably 10 μm or greater. The electrode space S is also preferably 18 μm or smaller.

RESPONSE PERFORMANCE COMPARISON BETWEEN EXAMPLES 9 AND 10 AND COMPARATIVE EXAMPLE 1

Figure 13:
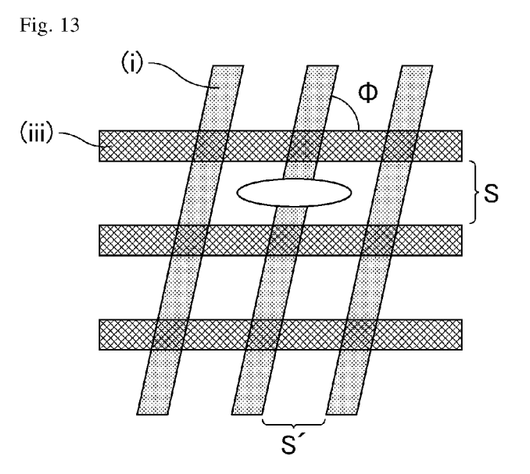
FIG. 13 is an illustrative drawing of Φ, S, and S'.

FIG. 13 is an illustrative drawing of Φ, S, and S'.

The angle Φ and the electrode space S are the same as those illustrated in FIG. 10. The electrode space between adjacent linear parts in the slit electrode (i) of the lower substrate in a plan view of the main surfaces of the substrates is defined as S'.

Figure 14:
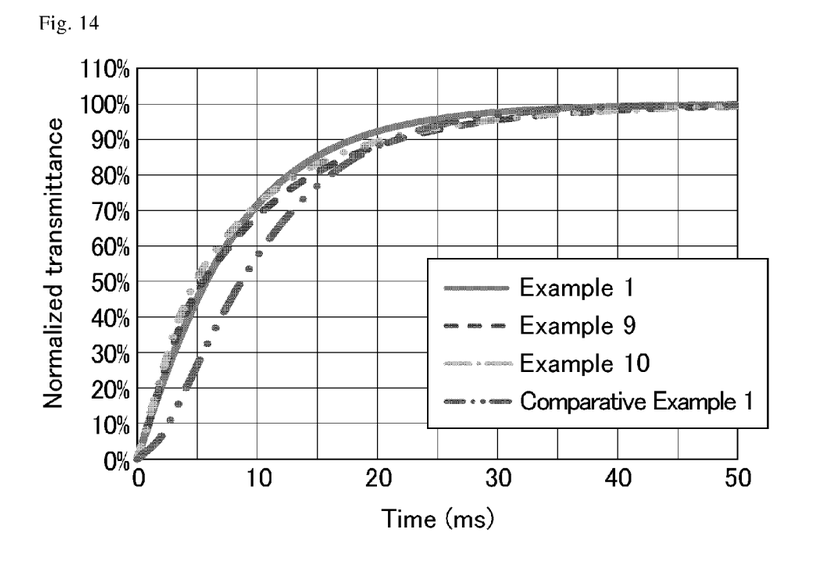
FIG. 14 shows simulation results with the normalized transmittance (%) plotted against rise time (ms) in Examples 1, 9, and 10 and Comparative Example 1.
Figure 15:
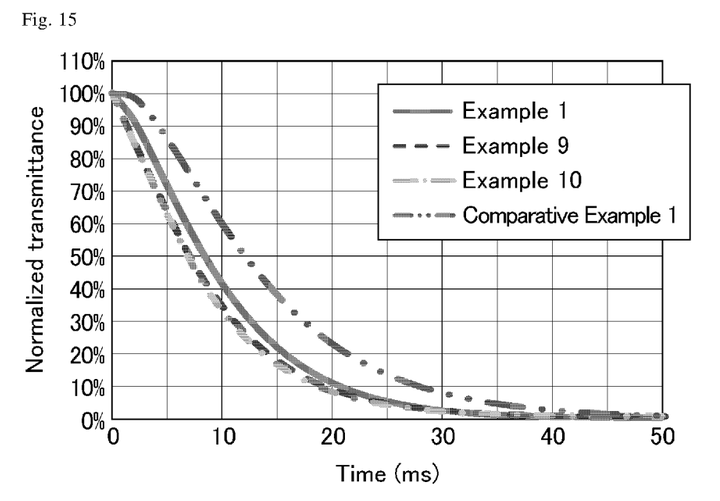
FIG. 15 shows simulation results with the normalized transmittance (%) plotted against decay time (ms) in Examples 1, 9, and 10 and Comparative Example 1.

FIG. 14 shows simulation results with the normalized transmittance (%) plotted against rise time (ms) in Examples 1, 9, and 10 and Comparative Example 1. FIG. 15 shows simulation results with the normalized transmittance (%) plotted against decay time (ms) in Examples 1, 9, and 10 and Comparative Example 1.

Examples 9 and 10 were the same as Example 1 (with the same angle Φ (70°) as in Example 1 and the same electrode space S (9 μm) as in Example 1) except that the electrode space S' was changed from 3 μm to 6 μm (Example 9) or 9 μm (Example 10). FIGS. 14 and 15 show the response waveforms in Examples 9 and 10, and Table 3 shows the time τr+τd in Examples 9 and 10. Since the electrode space S' is preferably 3 μm or greater for manufacturing reasons such as the yield, the minimum value of S' was set to 3 μm.

TABLE 3

|  | S' (μm) | τr + τd |
| --- | --- | --- |
| Example 1 | 3 | 35.4 |
| Example 9 | 6 | 37.7 |
| Example 10 | 9 | 36.3 |
| Comparative Example 1 | (FFS) | 41.9 |

FIG. 14, FIG. 15, and Table 3 show that with any of the S' values, the time tr+td was shorter than that in Comparative Example 1, meaning that the response speed increased. S' is preferably in the range of 3 μm to 9 μm.

Examples of the liquid crystal display device of the present invention include in-vehicle units (e.g., automotive navigation systems), electronic books, digital photo frames, industrial equipment, televisions, personal computers, smartphones, and tablet computers.

The details of the liquid crystal display device of the present invention, such as the electrode structure, can be confirmed by microscopic observation of the TFT substrate and the counter substrate with a device such as a scanning electron microscope (SEM).

REFERENCE SIGNS LIST (i), (iii): slit electrode
(ii): planar electrode
B: black display region utilizing oblique electric fields generated between upper and lower substrates
W: white display region utilizing fringe electric fields of lower substrate
CH: contact hole
TFT: thin-film transistor
SL: source line
GL: gate line
LC: liquid crystal molecule
10, 110: lower substrate
11, 21, 111, 121: glass substrate
13, 113: insulating layer
20, 120: upper substrate
30, 130: liquid crystal layer

The invention claimed is:

1. A liquid crystal display device comprising:
an upper substrate and a lower substrate; and
a liquid crystal layer disposed between the upper and lower substrates, wherein
the upper substrate includes an electrode,
the lower substrate includes paired electrodes,
the liquid crystal layer includes liquid crystal molecules that are aligned in parallel with the main surfaces of the upper substrate and the lower substrate with no voltage applied,
the liquid crystal display device provides one of a white display and a black display by utilizing an electric field generated between the paired electrodes of the lower substrate to rotate the liquid crystal molecules in one direction in a plane parallel to the main surfaces, and the other of the white display and the black display by utilizing an electric field generated by the respective electrodes of the upper substrate and the lower substrate to rotate the liquid crystal molecules in an opposite direction from the one direction in the plane parallel to the main surfaces, and
constant voltage is applied to the electrode of the upper substrate in both the white display and the black display.

2. The liquid crystal display device according to claim 1, wherein the electrode of the upper substrate and at least one of the paired electrodes of the lower substrate each include a linear portion.

3. The liquid crystal display device according to claim 1, wherein the electrode of the upper substrate is an electrode including a slit.

4. The liquid crystal display device according to claim 3, wherein the electrode including a slit has an electrode space S of 3 μm or greater.

5. The liquid crystal display device according to claim 1, wherein the paired electrodes of the lower substrate are defined by an electrode including a slit and disposed on a liquid crystal layer side and a planar electrode disposed on a side opposite to the liquid crystal layer.

6. The liquid crystal display device according to claim 5, wherein in a plan view of the main surfaces of the upper substrate and the lower substrate, an extension direction of the electrode including a slit of the upper substrate and an extension direction of the electrode including a slit of the lower substrate define an angle of 30° or greater but smaller than 90°.

7. The liquid crystal display device according to claim 1, wherein the liquid crystal layer includes a liquid crystal molecule having negative anisotropy of dielectric constant.

8. The liquid crystal display device according to claim 1, wherein the upper substrate and the lower substrate each include a linear polarizer.

9. A liquid crystal display device comprising:
an upper substrate and a lower substrate; and
a liquid crystal layer disposed between the upper and lower substrates, wherein the upper substrate includes an electrode, the lower substrate includes paired electrodes, the liquid crystal layer contains liquid crystal molecules that are aligned in parallel with the main surfaces of the upper and lower substrates with no voltage applied, the liquid crystal display device provides one of a white display and a black display by utilizing an electric field generated between the paired electrodes of the lower substrate to rotate the liquid crystal molecules in one direction in a plane parallel to the main surfaces, and the other of the white display and the black display by utilizing an electric field generated by the respective electrodes of the upper substrate and the lower substrate to rotate the liquid crystal molecules in an opposite direction from the one direction in the plane parallel to the main surfaces, and the electrode of the upper substrate and at least one of the paired electrodes of the lower substrate each include a linear portion.

10. The liquid crystal display device according to claim 9, wherein the electrode of the upper substrate is an electrode including a slit.

11. The liquid crystal display device according to claim 10, wherein the electrode including a slit has an electrode space S of 3 μm or greater.

12. The liquid crystal display device according to claim 9, wherein the paired electrodes of the lower substrate are defined by an electrode including a slit and disposed on a liquid crystal layer side and a planar electrode disposed on a side opposite to the liquid crystal layer.

13. The liquid crystal display device according to claim 12, wherein in a plan view of the main surfaces of the upper substrate and the lower substrate, an extension direction of the electrode including a slit of the upper substrate and an extension direction of the electrode including a slit of the lower substrate define an angle of 30° or greater but smaller than 90°.

14. The liquid crystal display device according to claim 9, wherein the liquid crystal layer includes a liquid crystal molecule having negative anisotropy of dielectric constant.

15. The liquid crystal display device according to claim 9, wherein the upper substrate and the lower substrate each include a linear polarizer.

16. A liquid crystal display device comprising:

an upper substrate and a lower substrate; and a liquid crystal layer disposed between the upper and lower substrates, wherein the upper substrate includes an electrode, the lower substrate includes paired electrodes, the liquid crystal layer includes liquid crystal molecules that are aligned in parallel with the main surfaces of the upper and lower substrates with no voltage applied, the liquid crystal display device provides one of a white display and a black display by utilizing an electric field generated between the paired electrodes of the lower substrate to rotate the liquid crystal molecules in one direction in a plane parallel to the main surfaces, and the other of the white display and the black display by utilizing an electric field generated by the respective electrodes of the upper substrate and the lower substrate to rotate the liquid crystal molecules in an opposite direction from the one direction in the plane parallel to the main surfaces, and the liquid crystal layer includes a liquid crystal molecule having negative anisotropy of dielectric constant.

17. The liquid crystal display device according to claim 16, wherein the electrode of the upper substrate is an electrode including a slit.

18. The liquid crystal display device according to claim 16, wherein the paired electrodes of the lower substrate are defined by an electrode including a slit and disposed on a liquid crystal layer side and a planar electrode disposed on a side opposite to the liquid crystal layer.

19. The liquid crystal display device according to claim 18, wherein in a plan view of the main surfaces of the upper substrate and the lower substrate, an extension direction of the electrode including a slit of the upper substrate and an extension direction of the electrode including a slit of the lower substrate define an angle of 30° or greater but smaller than 90°.

20. The liquid crystal display device according to claim 16, wherein the upper substrate and the lower substrate each include a linear polarizer.

* * * * *